US011558715B2

(12) United States Patent
Zeng et al.

(10) Patent No.: US 11,558,715 B2
(45) Date of Patent: Jan. 17, 2023

(54) METHOD AND APPARATUS FOR DETECTING SIGNAL PROPAGATION TYPE

(71) Applicants:Zhuoqi Zeng, Shanghai (CN); Steven Liu, Shanghai (CN); Huajun Yu, Shanghai (CN); Wei Wang, Shanghai (CN); Robert Bosch GmbH, Stuttgart (DE)

(72) Inventors: Zhuoqi Zeng, Shanghai (CN); Steven Liu, Shanghai (CN); Huajun Yu, Shanghai (CN); Wei Wang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/270,935

(22) PCT Filed: Aug. 31, 2018

(86) PCT No.: PCT/CN2018/103494
§ 371 (c)(1),
(2) Date: Feb. 24, 2021

(87) PCT Pub. No.: WO2020/042144
PCT Pub. Date: Mar. 5, 2020

(65) Prior Publication Data
US 2021/0211844 A1 Jul. 8, 2021

(51) Int. Cl.
*H04W 4/029* (2018.01)
*G01S 5/02* (2010.01)
*H04B 1/7163* (2011.01)

(52) U.S. Cl.
CPC .............. *H04W 4/029* (2018.02); *G01S 5/02* (2013.01); *H04B 1/7163* (2013.01)

(58) Field of Classification Search
CPC .................. G01S 5/02; H04B 1/7163
(Continued)

(56) References Cited

U.S. PATENT DOCUMENTS

| 6,121,927 A * | 9/2000 | Kalliojarvi ................ G01S 3/46 342/453 |
| 2005/0041725 A1* | 2/2005 | De Rivaz ........... H04B 1/71637 375/150 |

(Continued)

FOREIGN PATENT DOCUMENTS

| CN | 102932739 A | 2/2013 |
| CN | 107957577 A | 4/2018 |

OTHER PUBLICATIONS

Translation of International Search Report for Application No. PCT/CN2018/103494 dated May 16, 2019 (2 pages).

(Continued)

*Primary Examiner* — Ted M Wang
(74) *Attorney, Agent, or Firm* — Michael Best & Friedrich LLP

(57) ABSTRACT

The present invention relates to a method and apparatus for detecting a signal propagation type. The method comprises: calculating a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag; and determining the current type of signal propagation between the positioning base station and the positioning tag on the basis of the similarity value. The method and apparatus can detect the type of signal propagation between the positioning base station and positioning tag of the UWB positioning system.

8 Claims, 3 Drawing Sheets

(58) Field of Classification Search
USPC .................................................. 455/456.1
See application file for complete search history.

(56) References Cited

U.S. PATENT DOCUMENTS

2009/0268057 A1    10/2009  Wang
2014/0329520 A1*   11/2014  Militano ................ G01S 11/06
                                                          455/422.1

OTHER PUBLICATIONS

Meng et al., "Transmission Characteristics Analysis of IR-UWB Signal," IFIP International Conference on Wireless and Optical Communications Networks, 2009, 5 pages.
Decarli et al., "LOS/NLOS Detection for UWB Signals: A Comparative Study Using Experimental Data," 5th International Symposium on Wireless Pervasive Computing, 2010, pp. 169-173.
Wehs et al., "Improved Detection of Distorted IR-UWB Pulses Using Amplitude Spectrum in Indoor Environments," International Conference on Indoor Positioning and Indoor Navigation, 2014, 6 pages.

* cited by examiner

METHOD AND APPARATUS FOR DETECTING SIGNAL PROPAGATION TYPE

BACKGROUND OF THE INVENTION

The present invention relates to the field of ultra-wideband (UWB) positioning, in particular to a method and apparatus for detecting a signal propagation type, a computing device and a machine-readable storage medium.

UWB positioning is a technology for positioning an object indoors using an extremely narrow pulse response and a bandwidth exceeding 1 GHz. A UWB positioning system comprises multiple positioning base stations, and a positioning tag placed on an object to be positioned. The positioning tag transmits a pulse signal, which becomes a pulse response upon reaching the positioning base stations after channel modulation. The UWB positioning system uses the pulse response received by the positioning base stations from the positioning tag to determine the position of the object.

When signal propagation between the positioning base station and positioning tag is line-of-sight propagation unobstructed by any obstacle, the UWB positioning system can obtain an accurate position of the object, but if signal propagation between the positioning base station and positioning tag is non-line-of-sight propagation obstructed by an obstacle, then the position obtained by the UWB positioning system is generally inaccurate.

Thus, in UWB positioning, it is very important that the type of signal propagation between the positioning base station and positioning tag be identified.

SUMMARY OF THE INVENTION

The embodiments of the present invention provide a method and apparatus for detecting a signal propagation type, a computing device and a machine-readable storage medium, which are capable of detecting the type of signal propagation between a positioning base station and a positioning tag of a UWB positioning system.

A method for detecting a signal propagation type according to an embodiment of the present invention comprises: calculating a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag; and determining the current type of signal propagation between the positioning base station and the positioning tag on the basis of the similarity value.

An apparatus for detecting a signal propagation type according to an embodiment of the present invention comprises: a computing module, configured to calculate a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag; and a determining module, configured to determine the current type of signal propagation between the positioning base station and the positioning tag on the basis of the similarity value.

A computing device according to an embodiment of the present invention comprises: a processor; and a memory, storing an executable instruction which, when executed, causes the processor to execute an operation included in the method described above.

A machine-readable storage medium according to an embodiment of the present invention has an executable instruction thereon; when the executable instruction is executed, a machine is caused to execute an operation included in the method described above.

The solution in embodiments of the present invention uses a pulse response currently received by a positioning base station of a UWB positioning system from a positioning tag, and multiple reference pulse responses previously received by the positioning base station from the positioning tag, to determine the current type of signal propagation between the positioning base station and the positioning tag; thus, the solution in embodiments of the present invention can detect the type of signal propagation between the positioning base station and positioning tag of the UWB positioning system.

BRIEF DESCRIPTION OF THE DRAWINGS

Other features, characteristics, benefits and advantages of the present invention will become more obvious through the following detailed description, which makes reference to the drawings. Here.

DETAILED DESCRIPTION

Various embodiments of the present invention are described in detail below with reference to the drawings.

Figure 1:
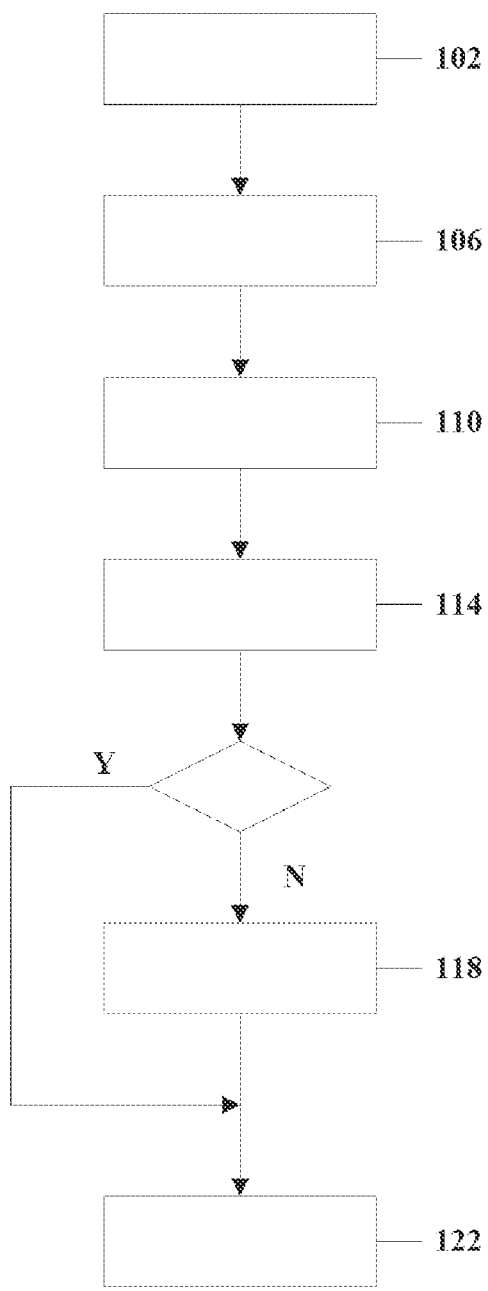
FIG. 1 shows a general flow chart of a method for detecting a signal propagation type according to an embodiment of the present invention.

FIG. 1 shows a general flow chart of a method for detecting a signal propagation type according to an embodiment of the present invention. The method 100 shown in FIG. 1 may be realized by any computing device having computing capability. The computing device may be, but is not limited to, a desktop computer, notebook computer, tablet computer or server, etc.

As shown in FIG. 1, in box 102, a certain positioning base station Bi in a UWB positioning system currently receives a pulse response IN from a certain positioning tag Ti.

In box 106, the currently received pulse response IN and a reference pulse response MR are used to calculate a similarity value SV, which indicates the degree of similarity between the pulse response IN and the reference pulse response MR. The reference pulse response MR is a pulse response previously received by the positioning base station Bi from the positioning tag Ti. Here, for an initial reference pulse response MR, it is necessary to manually determine the type of signal propagation between the positioning base station Bi and the positioning tag Ti when the initial reference pulse response MR is received, wherein the type of signal propagation may be line-of-sight propagation or non-line-of-sight propagation.

In one aspect, the similarity value SV is calculated while regarding both the pulse response IN and reference pulse response MR as probability density functions. In this case, the similarity value SV may be calculated using an algorithm, for example but not limited to the KS-test (Kolmogorov-Smirnov test), Chi-Squared test, G-test, Fisher's exact test, binomial test or exact (significance) test, etc. Alternatively, the maximum distance of the cumulative distribution function between the pulse response IN and the reference pulse response MR may be calculated as the similarity value SV.

In another aspect, the similarity value SV is calculated while regarding both the pulse response IN and reference pulse response MR as trajectories. In this case, the Euclidean distance, dynamic time warping, longest common sub-sequence, edit distance, Chebyshev distance, Manhattan distance, Hausdorff distance, Frechet distance, one way distance, cosine similarity, locality in-between polylines, polylines or clue-aware trajectory similarity or a related coefficient value (e.g. root mean square, variance, etc.) between the pulse response IN and the reference pulse response MR may be calculated as the similarity value SV.

In box 110, the current type of signal propagation between the positioning base station Bi and the positioning tag Ti is determined using the calculated similarity value SV. For example but without limitation, if the similarity value SV is greater than or equal to a designated threshold F1, then it is determined that the current type of signal propagation between the positioning base station Bi and the positioning tag Ti is a first signal propagation type, which is the type of signal propagation between the positioning base station Bi and the positioning tag Ti when the reference pulse response MR was received. If the similarity value SV is less than the designated threshold F1, then it is determined that the current type of signal propagation between the positioning base station Bi and the positioning tag Ti is a second signal propagation type, which is another signal propagation type different from the type of signal propagation between the positioning base station Bi and the positioning tag Ti when the reference pulse response MR was received.

In box 114, a determination is made as to whether the determined signal propagation type is the same as the type of signal propagation between the positioning base station Bi and the positioning tag Ti when the reference pulse response MR was received.

In box 118, if the determination result of box 114 is negative (N), then the pulse response IN is stored as the reference pulse response MR, and then the procedure continues to box 122. Here, the reference pulse response MR can be updated by means of boxes 114-118.

If the determination result of box 114 is affirmative (Y), then the procedure continues to box 122.

In box 122, the method 100 ends.

The solution of this embodiment uses a pulse response currently received by a positioning base station of the UWB system from a positioning tag, and a reference pulse response previously received by the positioning base station from the positioning tag, to determine the current type of signal propagation between the positioning base station and the positioning tag; thus, the solution of this embodiment can detect the type of signal propagation between the positioning base station and positioning tag of the UWB positioning system.

Those skilled in the art will understand that although the similarity value is calculated while regarding both the pulse response IN and reference pulse response MR as probability density functions or trajectories in the embodiments above, the present invention is not limited to this. In other embodiments of the present invention, the pulse response IN and reference pulse response MR may also be used to calculate the similarity value by any other method.

Those skilled in the art will understand that although the reference pulse response MR is variable in the embodiments above, the present invention is not limited to this. In other embodiments of the present invention, the reference pulse response MR may also be fixed and non-variable.

Figure 2:
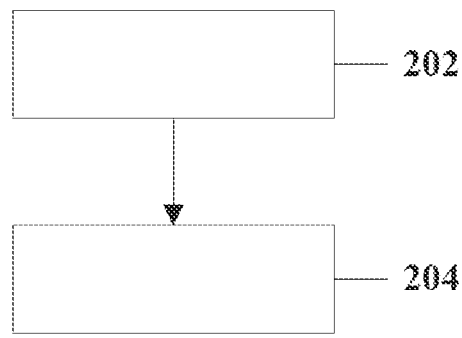
FIG. 2 shows a flow chart of a method for detecting a signal propagation type according to an embodiment of the present invention.

FIG. 2 shows a flow chart of a method for detecting a signal propagation type according to an embodiment of the present invention. The method 200 shown in FIG. 2 may be realized by any computing device having computing capability. The computing device may be, but is not limited to, a desktop computer, notebook computer, tablet computer or server, etc.

As shown in FIG. 2, the method 200 may comprise, in box 202, calculating a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag.

The method 200 may further comprise, in box 204, determining the current type of signal propagation between the positioning base station and the positioning tag on the basis of the similarity value.

In one aspect, the method 200 may further comprise: storing the currently received pulse response as the reference pulse response if the determined signal propagation type is not the same as the type of signal propagation between the positioning base station and the positioning tag when the reference pulse response was received.

In another aspect, the similarity value is calculated while regarding the currently received pulse response and the reference pulse response as probability density functions, or the similarity value is calculated while regarding the currently received pulse response and the reference pulse response as trajectories.

In another aspect, box 204 comprises: determining that the current type of signal propagation between the positioning base station and the positioning tag is a first signal propagation type, which is the type of signal propagation between the positioning base station and the positioning tag when the reference pulse response was received, if the similarity value is greater than or equal to a designated threshold; and determining that the current type of signal propagation between the positioning base station and the positioning tag is a second signal propagation type, which is another signal propagation type different from the type of signal propagation between the positioning base station and the positioning tag when the reference pulse response was received, if the similarity value is less than the designated threshold.

Figure 3:
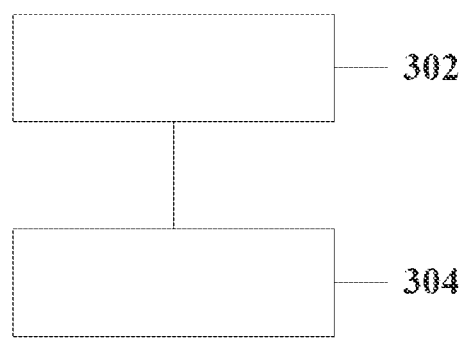
FIG. 3 shows a schematic diagram of an apparatus for detecting a signal propagation type according to an embodiment of the present invention.

FIG. 3 shows a schematic diagram of an apparatus for detecting a signal propagation type according to an embodiment of the present invention. The apparatus 300 shown in FIG. 3 may be implemented using software, hardware or a combination of software and hardware. The apparatus 300 shown in FIG. 3 may for example be installed in any suitable computing device having computing capability.

As shown in FIG. 3, the apparatus 300 may comprise a computing module 302 and a determining module 304. The computing module 302 is configured to calculate a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag. The determining module 304 is configured to determine the current type of signal propagation between the positioning base station and the positioning tag on the basis of the similarity value.

In one aspect, the apparatus 300 may further comprise: a storage module, configured to store the currently received pulse response as the reference pulse response if the determined signal propagation type is not the same as the type of signal propagation between the positioning base station and the positioning tag when the reference pulse response was received.

In another aspect, the similarity value is calculated while regarding the currently received pulse response and the reference pulse response as probability density functions, or the similarity value is calculated while regarding the currently received pulse response and the reference pulse response as trajectories.

In another aspect, the determining module 304 is further configured to: determine that the current type of signal propagation between the positioning base station and the positioning tag is a first signal propagation type, which is the type of signal propagation between the positioning base station and the positioning tag when the reference pulse response was received, if the similarity value is greater than or equal to a designated threshold; and determine that the current type of signal propagation between the positioning base station and the positioning tag is a second signal propagation type, which is another signal propagation type different from the type of signal propagation between the positioning base station and the positioning tag when the reference pulse response was received, if the similarity value is less than the designated threshold.

Figure 4:
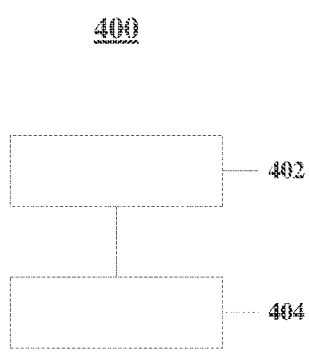
FIG. 4 shows a schematic diagram of a computing device according to an embodiment of the present invention.

FIG. 4 shows a schematic diagram of a computing device according to an embodiment of the present invention. As shown in FIG. 4, the computing device 400 may comprise a processor 402 and a memory 404 coupled to the processor 402. The memory 404 stores an executable instruction which, when executed, causes the processor 402 to execute the method 100 or 200.

The embodiments of the present invention also provide a machine-readable storage medium, having an executable instruction thereon, wherein a machine is caused to execute the method 100 or 200 when the executable instruction is executed.

Those skilled in the art will understand that various alterations, amendments and changes could be made to all of the embodiments disclosed above without deviating from the substance of the invention; all such alterations, amendments and changes should fall within the scope of protection of the present invention. Thus, the scope of protection of the present invention is defined by the attached claims.

The invention claimed is:

1. A method for detecting a signal propagation type, the method comprising:
    calculating a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag; and
    determining the current type of signal propagation between the positioning base station and the positioning tag on the basis of the similarity value storing the currently received pulse response as the reference pulse response when the determined signal propagation type is not the same as the type of signal propagation between the positioning base station and the positioning tag when the reference pulse response was received.

2. The method as claimed in claim 1, wherein
    the similarity value is calculated while regarding the currently received pulse response and the reference pulse response as probability density functions, or
    the similarity value is calculated while regarding the currently received pulse response and the reference pulse response as trajectories.

3. The method as claimed in claim 1, wherein the step of determining the current type of signal propagation between the positioning base station and the positioning tag comprises:
    determining that the current type of signal propagation between the positioning base station and the positioning tag is a first signal propagation type, which is the type of signal propagation between the positioning base station and the positioning tag when the reference pulse response was received, when the similarity value is greater than or equal to a designated threshold; and
    determining that the current type of signal propagation between the positioning base station and the positioning tag is a second signal propagation type, which is another signal propagation type different from the type of signal propagation between the positioning base station and the positioning tag when the reference pulse response was received, when the similarity value is less than the designated threshold.

4. A computing device, comprising:
    a processor; and
    a memory, storing an executable instruction which, when executed, causes the processor to execute the method as claimed in claim 1.

5. An apparatus for detecting a signal propagation type, the apparatus comprising:
    a computing module configured to calculate a similarity value of a currently received pulse response and a reference pulse response when a certain positioning base station of a UWB positioning system currently receives a pulse response from a certain positioning tag, the similarity value indicating the degree of similarity between the currently received pulse response and the reference pulse response, wherein the reference pulse response is a pulse response previously received by the positioning base station from the positioning tag; and
    a determining module, configured to determine the current type of signal propagation between the positioning base station and the positioning tag on the basis of the similarity value a storage module, configured to store the currently received pulse response as the reference pulse response ##when the determined signal propagation type is not the same as the type of signal propagation between the positioning base station and the positioning tag when the reference pulse response was received.

6. The apparatus as claimed in claim 5, wherein
the similarity value is calculated while regarding the currently received pulse response and the reference pulse response as probability density functions, or
the similarity value is calculated while regarding the currently received pulse response and the reference pulse response as trajectories.

7. The apparatus as claimed in claim 5, wherein the determining module is further configured to:
determine that the current type of signal propagation between the positioning base station and the positioning tag is a first signal propagation type, which is the type of signal propagation between the positioning base station and the positioning tag when the reference pulse response was received, when the similarity value is greater than or equal to a designated threshold; and
determine that the current type of signal propagation between the positioning base station and the positioning tag is a second signal propagation type, which is another signal propagation type different from the type of signal propagation between the positioning base station and the positioning tag when the reference pulse response was received, when the similarity value is less than the designated threshold.

8. A non-transitory, computer-readable storage medium, containing instructions that when executed by a computer cause the computer to determine that the current type of signal propagation between a positioning base station and a positioning tag is a first signal propagation type, which is the type of signal propagation between the positioning base station and the positioning tag when a reference pulse response was received, when a similarity value is greater than or equal to a designated threshold, wherein the reference pulse response is a pulse response previously received by the positioning base station from the positioning tag; and
determine that the current type of signal propagation between the positioning base station and the positioning tag is a second signal propagation type, which is another signal propagation type different from the type of signal propagation between the positioning base station and the positioning tag when the reference pulse response was received, when the similarity value is less than the designated threshold store the currently received pulse response as the reference pulse response when the determined signal propagation type is not the same as the type of signal propagation between the positioning base station and the positioning tag when the reference pulse response was received.

* * * * *